(12) United States Patent
Kim et al.

(10) Patent No.: US 9,285,634 B2
(45) Date of Patent: Mar. 15, 2016

(54) DISPLAY DEVICE

(71) Applicant: Samsung Display Co., Ltd., Yongin (KR)

(72) Inventors: Kyung-Min Kim, Hwaseong-si (KR); Seung-Hwa Ha, Osan-si (KR); Yongkyu Kang, Yongin-si (KR); Sung-Kyu Shim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 188 days.

(21) Appl. No.: 13/857,468

(22) Filed: Apr. 5, 2013

(65) Prior Publication Data

US 2014/0146521 A1 May 29, 2014

(30) Foreign Application Priority Data

Nov. 27, 2012 (KR) .................. 10-2012-0135376

(51) Int. Cl.
*G02F 1/1335* (2006.01)
*F21V 8/00* (2006.01)

(52) U.S. Cl.
CPC ........ *G02F 1/133615* (2013.01); *G02B 6/0055* (2013.01); *G02F 1/133605* (2013.01)

(58) Field of Classification Search
CPC ............ G02F 1/133615; G02B 6/0058; G02B 6/0055; G02B 6/0051; G02B 6/0005; G02B 6/0045–6/0046; G02B 6/0043; G02B 6/004; G02B 6/0035
See application file for complete search history.

(56) References Cited

U.S. PATENT DOCUMENTS

| | | | |
|---|---|---|---|
| 4,874,228 A | 10/1989 | Aho et al. | |
| 7,267,451 B2 | 9/2007 | Kuo et al. | |
| 8,054,407 B2 | 11/2011 | Imojo et al. | |
| 8,834,000 B2 | 9/2014 | Kim et al. | |
| 2006/0203512 A1* | 9/2006 | Ko et al. ................. | 362/609 |
| 2010/0296270 A1 | 11/2010 | Gomi et al. | |
| 2010/0321919 A1 | 12/2010 | Yang | |
| 2011/0007506 A1 | 1/2011 | Kinoshita | |
| 2011/0211335 A1 | 9/2011 | Ko | |
| 2012/0250293 A1* | 10/2012 | Jeong et al. ............. | 362/97.2 |

FOREIGN PATENT DOCUMENTS

| | | |
|---|---|---|
| JP | 08-043819 | 2/1996 |
| JP | 08-161918 | 6/1996 |
| JP | 2000-315056 | 11/2000 |

(Continued)

*Primary Examiner* — Julie Bannan
(74) *Attorney, Agent, or Firm* — H.C. Park & Associates, PLC

(57) ABSTRACT

A display device includes a light source, a mirror reflection guide member, a diffusion reflection member, and a display panel. The light source extends in a first direction and is configured to emit light. The mirror reflection guide member is configured to: support the light source, and guide at least some of the light to a second direction substantially perpendicular to the first direction. The mirror reflection guide member includes a plurality of guide patterns extending in the second direction and arranged in the first direction. The diffusion reflection member is configured to guide at least some of the light to a third direction substantially perpendicular to the first and second directions. The display panel is disposed on the mirror reflection guide member and the diffusion reflection member and is configured to display an image using the light guided by the diffusion reflection member.

13 Claims, 21 Drawing Sheets

(56) References Cited

FOREIGN PATENT DOCUMENTS

| JP | 2006-048968 | 2/2006 |
|----|-------------|--------|
| JP | 2012-054026 | 3/2012 |
| JP | 2012-178473 | 9/2012 |
| KR | 20-0240563 | 12/1998 |
| KR | 10-1001450 | 9/2005 |
| KR | 10-0712107 | 6/2006 |
| KR | 10-2007-0064752 | 6/2007 |
| KR | 10-2009-0067131 | 6/2009 |
| KR | 10-0959660 | 12/2009 |
| KR | 10-2012-0026691 | 3/2012 |
| KR | 10-2013-0025262 | 3/2013 |

\* cited by examiner

Fig. 9A
Fig. 9B
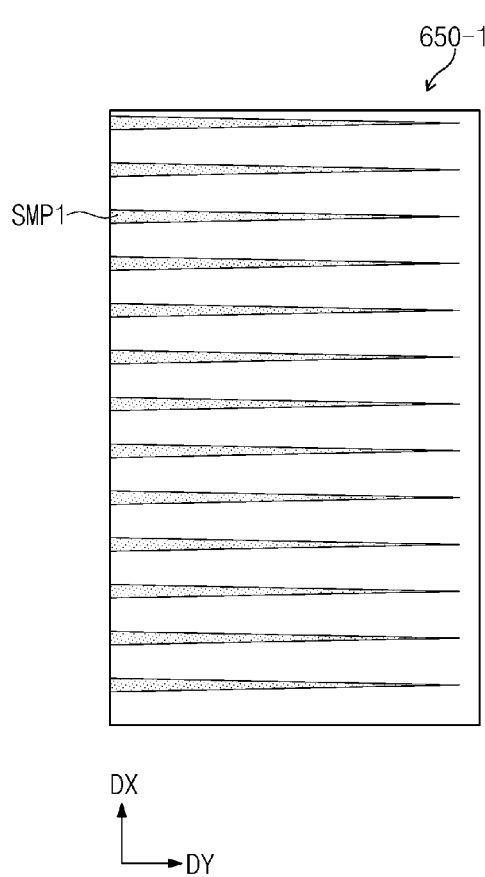
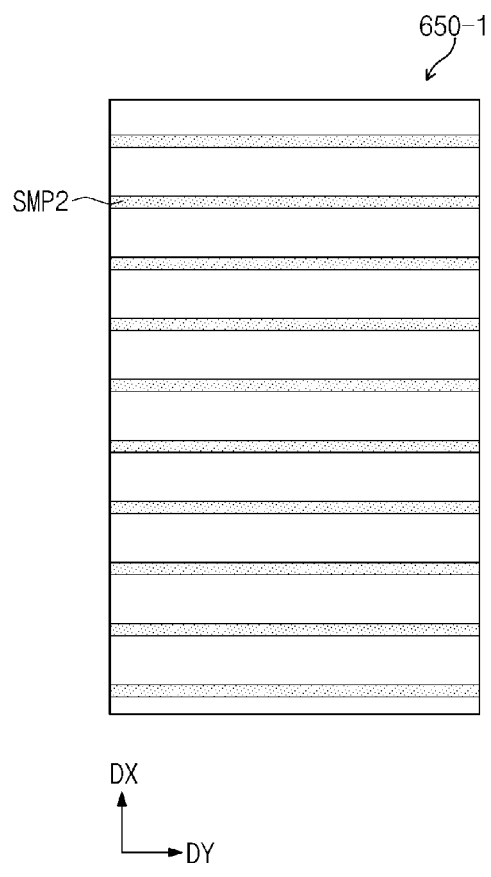

DISPLAY DEVICE

CROSS-REFERENCE TO RELATED APPLICATION

This application claims priority from and the benefit of Korean Patent Application No. 10-2012-0135376, filed on Nov. 27, 2012, which is incorporated by reference for all purposes as if set forth herein.

BACKGROUND

1. Field

The present disclosure relates to display technology, and more particularly, to display devices configured to have improved display quality.

2. Discussion

In general, a display device may be classified into a transmissive type, a transflective type, and a reflective type. Transmissive type display devices and transflective type display devices typically include a display panel configured to display an image and a backlight unit configured to provide the display panel with light.

Conventional backlight providing units typically include a light source configured to emit the light and a light guide member. The light source may include a circuit board and a plurality of light emitting devices disposed (e.g., formed, mounted, etc.) on the circuit board. The light guide member may be disposed under the display panel. The light source may be configured to face a side surface of the light guide member. In this manner, the light guide member may be configured to guide the light provided from the light source to the display panel. As display devices become increasingly thinner, it is becoming ever more difficult to provide such display devices with uniform brightness, and thereby, uniform display quality. Therefore, there is a need for an approach that provides efficient, cost effective techniques to provide slim display devices with improved, uniform brightness characteristics.

The above information disclosed in this Background section is only for enhancement of understanding of the background of the invention and therefore it may contain information that does not form the prior art that is already known in this country to a person of ordinary skill in the art.

SUMMARY

Exemplary embodiments provide display devices having a slim size (e.g., thickness), which are configured to display images with uniform brightness.

Additional aspects will be set forth in the detailed description which follows and, in part, will be apparent from the disclosure, or may be learned by practice of the invention.

Exemplary embodiments provide a display device including: a light source, an optical member, and a display panel. The light source extends in a first direction and is configured to emit light. The optical member is configured to guide the light emitted from the light source. The display panel is disposed on the optical member and is configured to display an image using the light guided by optical member. The optical member includes a mirror reflection area, a diffusion reflection area, and a boundary area. The mirror reflection area is disposed adjacent to the light source and is configured to guide at least some of the light emitted from the light source to a second direction substantially perpendicular to the first direction. The diffusion reflection area is spaced apart from the mirror reflection area in the second direction and is configured to guide at least some of the light emitted from light source to the display panel. The boundary area is disposed between the mirror reflection area and the diffusion reflection area and includes a plurality of mirror reflection patterns and a plurality of diffusion reflection patterns.

Exemplary embodiments provide a display device including: a light source, a display panel, a mirror reflection guide member, and a diffusion reflection member. The light source extends in a first direction and is configured to emit light. The mirror reflection guide member is configured to: support the light source, and guide at least some of the light emitted from the light source to a second direction substantially perpendicular to the first direction. The diffusion reflection member is configured to guide at least some of the light emitted from the light source to a third direction substantially perpendicular to the first and second directions. A portion of the diffusion reflection member is disposed on a portion of the mirror reflection guide member. One of the portion of the mirror reflection guide member and the portion of the diffusion reflection member includes a plurality of cut away patterns.

Exemplary embodiments provide a display device including: a light source, a display panel, a mirror reflection guide member, and a diffusion reflection member. The light source extends in a first direction and is configured to emit light. The mirror reflection guide member is configured to: support the light source, and guide at least some of the light emitted from the light source to a second direction substantially perpendicular to the first direction. The mirror reflection guide member includes a plurality of guide patterns extended in the second direction and arranged in the first direction. The diffusion reflection member is configured to guide at least some of the light emitted from the light source to a third direction substantially perpendicular to the first and second directions. The display panel is disposed on the mirror reflection guide member and the diffusion reflection member and is configured to display an image using the light guided by the diffusion reflection member.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIGS. 9A-9D are plan views of a diffusion reflective member of the optical member of FIGS. 8A and 8B, according to exemplary embodiments.

DETAILED DESCRIPTION OF EXEMPLARY EMBODIMENTS

Figure 1:
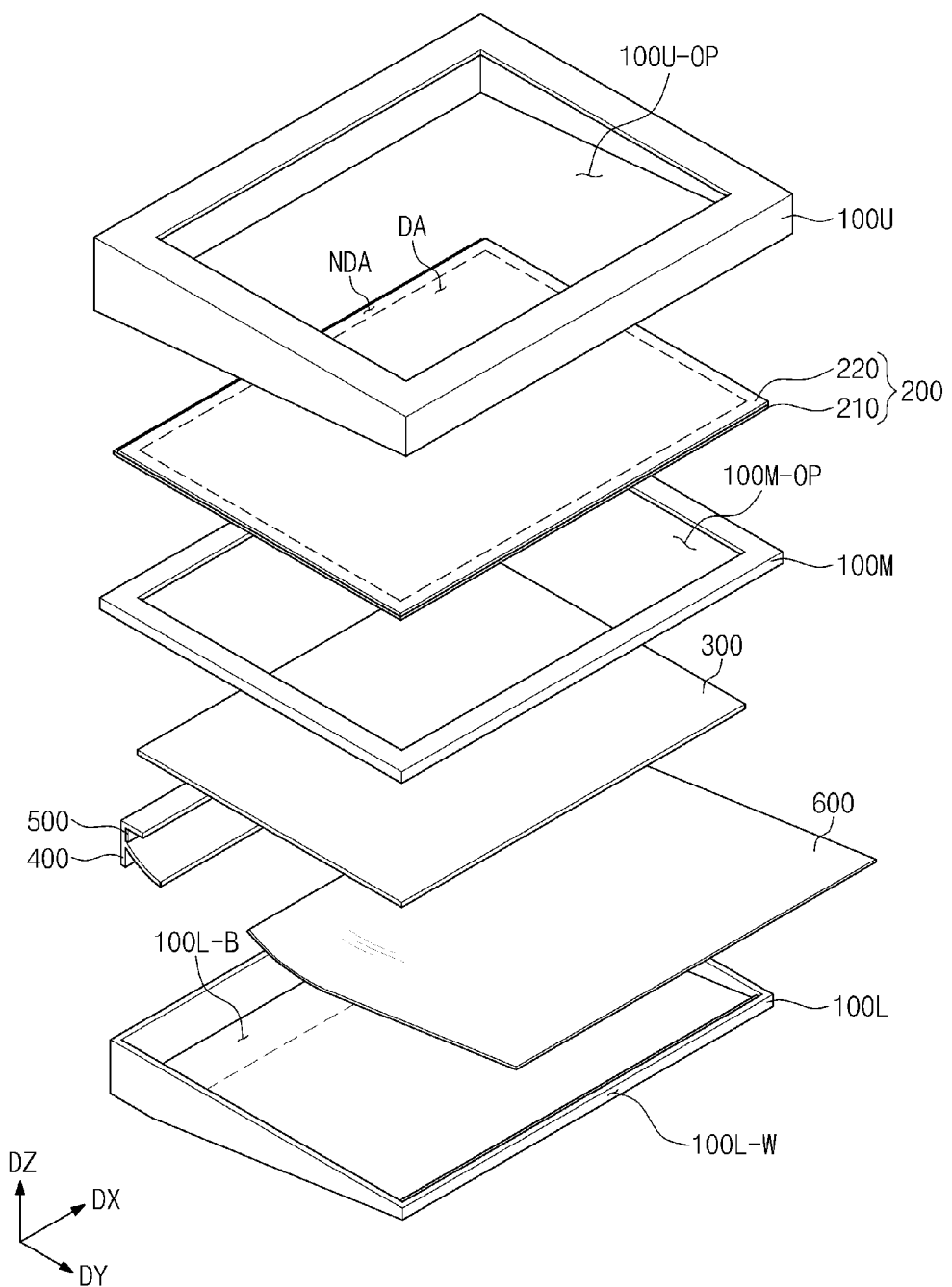
FIG. 1 is an exploded perspective view of a display device, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

Spatially relative terms, such as "beneath," "below," "lower," "above," "upper," and/or the like, may be used herein for descriptive purposes, and thereby, to describe one element or feature's relationship to another element(s) or feature(s) as illustrated in the drawings. Spatially relative terms are intended to encompass different orientations of an apparatus in use or operation in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and as such, the spatially relative descriptors used herein interpreted accordingly.

The terminology used herein is for the purpose of describing particular embodiments and is not intended to be limiting. As used herein, the singular forms "a," "an," and "the" are intended to include the plural forms as well, unless the context clearly indicates otherwise. Moreover, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

It is noted that exemplary embodiments may find industrial applicability in any suitable display device, such as various non-self-emissive display technologies. For instance, non-self-emissive display devices may include liquid crystal display (LCD) devices, electrophoretic display (EPD) devices, electrowetting display (EWD) devices, and/or the like.

Figure 2:
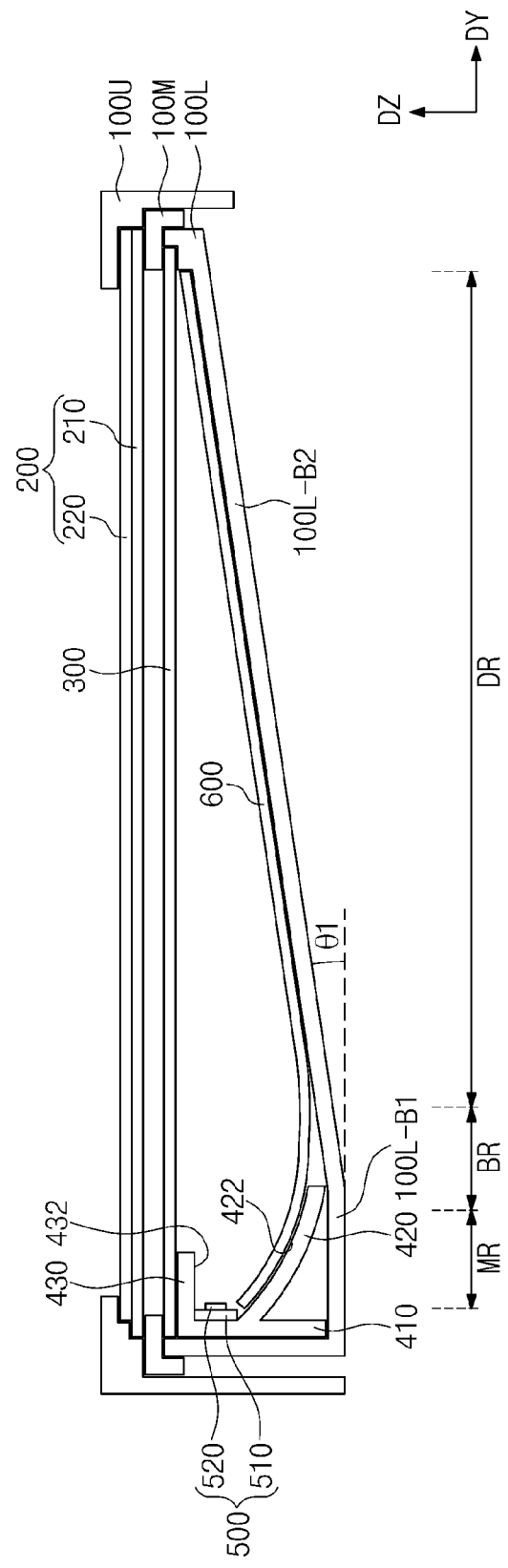
FIG. 2 is a cross-sectional view of the display device of FIG. 1, according to exemplary embodiments.
Figure 3:
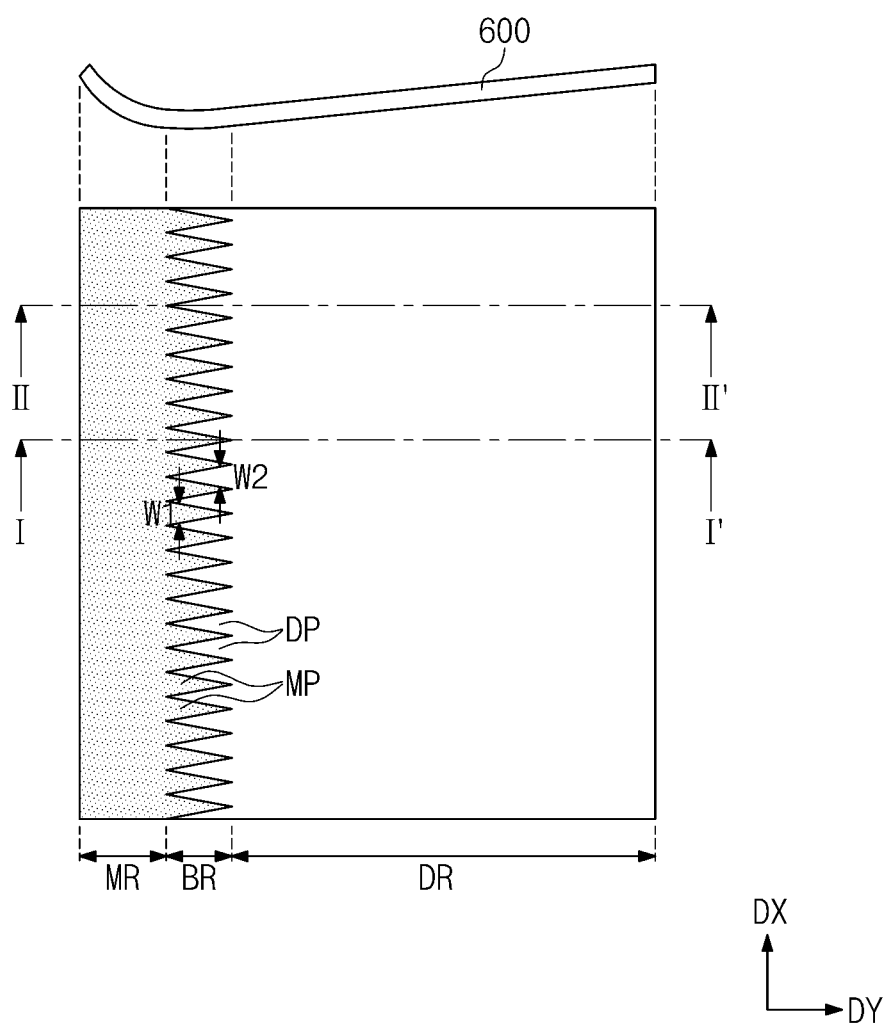
FIG. 3 is a plan view of an optical member of the display device of FIG. 1, according to exemplary embodiments.

FIG. 1 is an exploded perspective view of a display device, according to exemplary embodiments. FIG. 2 is a cross-sectional view of the display device of FIG. 1. FIG. 3 is a plan view of an optical member of the display device of FIG. 1.

Referring to FIGS. 1 and 2, the display device includes a protective member 100U, 100M, and 100L, a display panel 200, an optical sheet 300, a guide member 400, a light source 500, and an optical member 600. While specific reference will be made hereto, it is contemplated that the display device may embody many forms and include multiple and/or alternative components and configurations. According to exemplary embodiments, a portion of the protective member 100U, 100M, and 100L, the optical sheet 300, and the guide member 400 may be omitted.

In exemplary embodiments, the display panel may have rectangular shape when viewed in a plan view, but it is contemplated that any other suitable configuration may be utilized. Hereinafter, a direction of a long side of the display panel 200 is referred to as a first direction DX, a direction of a short side of the display panel 200 is referred to as a second direction DY, and a direction of a normal line to a surface of the display panel 200 is referred to as a third direction DZ.

The protective member 100U, 100M, and 100L includes an upper protective member 100U, a lower protective member 100L coupled to the upper protective member 100U, and an intermediate protective member 100M disposed between the upper protective member 100U and the lower protective member 100L. The upper and lower protective members 100U and 100L are configured to accommodate and support different elements and protect the accommodated/supported elements.

The upper protective member 100U is disposed on the display panel 200. The upper protective member 100U includes an opening portion 100U-OP formed therethrough and configured to expose a display area DA of the display panel 200. The display area DA corresponds to an area in which an image is displayed, and thereby, viewable to at least one observer. The upper protective member 100U is disposed to overlap a non-display area NDA of the display panel 200. In exemplary embodiments, the non-display area NDA corresponds to an edge of the display panel 200, in which an image is not displayed, however, it is contemplated that the non-display area NDA may extend into one or more other portions of the display panel 200.

The lower protective member 100L is configured to accommodate (or support) the guide member 400 and the optical member 600. In addition, the lower protective member 100L is also configured to support a portion of the optical sheet 300. The lower protective member 100L includes a bottom portion 100L-B and a sidewall portion 100L-W. The sidewall portion 100L-W may be bent upward from the bottom portion 100L-B or may be coupled to the bottom portion 100L-B.

As seen in FIG. 1, the bottom portion 100L-B may have a rectangular shape when viewed in a plan view, however, it is contemplated that the bottom portion 100L-B may be configured based on a geometric configuration of the display device. The sidewall portion 100L-W is bent from four sides of the bottom portion 100L-B in the third direction DZ. The sidewall portion 100L-W may be divided into, for instance, four parts respectively corresponding to four sides of the bottom portion 100L-B. Depending, however, on the configuration of the bottom portion 100L-B, the number of sidewall parts extending in the third direction DZ may be of lesser or greater numbers. Furthermore, it is also contemplated that a portion of the four sides of the bottom portion 100L-B may be omitted.

The bottom portion 100L-B may also include a plane portion 100L-B1 extending in the second direction DY and an inclined portion 100L-B2 extending from the plane portion 100L-B1. The inclined portion 100L-B2 is bent at a predetermined angle θ1 with respect to the plane portion 100L-B1. According to exemplary embodiments, the bottom portion 100L-B may have any suitable shape as long as the bottom portion 100L-B includes the plane portion 100L-B1 and the inclined portion 100L-B2 inclined with respect to the plane portion 100L-B1.

The intermediate protective member 100M is configured to support the display panel 200 via the non-display area NDA of the display panel 200. The intermediate protective member 100M may be formed of a plastic material configured to absorb impacts and/or other environmental forces. It is contemplated, however, that any other suitable material may be utilized. The intermediate protective member 100M may be a frame with a rectangular shape. In this manner, the intermediate protective member 100M may include an opening portion 100M-OP formed therethrough. According to exemplary embodiments, the intermediate protective member 100 may be omitted. In such instances, the display panel 200 may be supported by the lower protective member 100L.

According to exemplary embodiments, the display panel 200 is configured to display images. The display panel 200 may be a transmissive type or a transflective type display panel. For instance, the display panel 200 may be, but is not limited to, a liquid crystal display (LCD) panel, an electrophoretic display (EPD) panel, or an electrowetting display (EWD) panel. For descriptive purposes, exemplary embodiments of display panel 200 are described in association with an LCD panel implementation. As such, the LCD panel 200 may include a first substrate 210, a second substrate 220, and a liquid crystal (LC) layer (not shown) disposed between the first substrate 210 and the second substrate 220.

The optical sheet 300 is disposed under the display panel 200, i.e., the optical sheet 300 is disposed between the lower protective member 100L and the display panel 200. The optical sheet 300 is supported by the guide member 400 and the sidewall portion 100L-W of the lower protective member 100L. Such a configuration enables the optical sheet 300 to be disposed substantially parallel to the display panel 200.

While not illustrated, the optical sheet 300 includes, for instance, a prism sheet. The prism sheet may be configured to condense incident light propagating in a vertical direction (e.g., in the third direction DZ) with respect to the surface of the display panel 200. In addition, the optical sheet 300 may further include a diffusion sheet (not shown) configured to diffuse incident light. The diffusion sheet may be disposed under the prism sheet, i.e., the prism sheet may be disposed between the diffusion sheet and the display panel 200.

According to exemplary embodiments, the guide member 400 is configured to support the light source 500. The light source 500 and the guide member 400 extend in the first direction DX.

The guide member 400 is disposed on the plane portion 100L-B1 of the bottom portion 100L-B of the lower protective member 100L. The guide member 400 includes a body portion 410, a first guide portion 420, and a second guide portion 430. According to exemplary embodiments, it is contemplated that the second guide portion 430 may be omitted. The guide member 400 is formed of (or includes), for example, a plastic resin via injection molding, compression molding, extrusion molding, etc. It is noted; however, that any other suitable material and/or fabrication technique may be utilized.

The body portion 410 is disposed adjacent to a portion of the sidewall portion 100L-W bent from a side corresponding of the plane portion 100L_B1 among the four sides of the bottom portion 100L-B1 of the lower protective member 100. For instance, the body portion 410 may be disposed adjacent to a portion of the sidewall portion 100L-W that is bent in the third direction DZ, and thereby, extends in the first direction DX between two "long" edges of the display device extending in the second direction DY. The light source 500 is coupled to the body portion 410.

The first and second guide portions 420 and 430 are connected to the body portion 410 and spaced apart from each other in the third direction DZ. The first guide portion 420 includes a first surface 422 configured to support a portion of the optical member 600, and the second guide portion 430 includes a second surface 432 facing the first surface 422 in the third direction DZ. The second surface 432 may be substantially parallel to the plane portion 100L-B1.

The first surface 422 is inclined as the first surface 422 extends toward the body portion 410. That is, a distance between the first surface 422 and the display panel 200 decreases as the first surface extends in the second direction DY towards the body portion 410. The first surface 422 may be a concave surface.

The light source 500 includes a circuit board 510 and a plurality of light emitting devices 520 disposed (e.g., mounted, formed, etc.) on the circuit board 510. The circuit board 510 may extend in the first direction DX. The circuit board 510 includes at least one insulating layer (not shown) and at least one circuit layer (not shown).

Each light emitting device 520 may be a light emitting diode. The light emitting diode is configured to receive a dimming signal and a driving voltage from the circuit layer of the circuit board 510. The light emitting devices 520 are spaced apart from each other at, for instance, regular intervals and successively arranged in the first direction DX. It is contemplated, however, that any other suitable arrangement of light emitting devices 520 may be utilized, such as irregularly spaced light emitting devices 520. It is also contemplated that the light emitting devices 520 may be replaced with one or more cold cathode fluorescent lamps (CCFL).

Referring to FIGS. 2 and 3, the optical member 600 is configured to guide light provided from the light source 500. In this manner, the optical member 600 is used as a light guide member. The optical member 600 is configured to guide light so that the light propagates in the second and third directions DY and DZ.

A portion of the optical member 600 may be supported by the first guide portion 420, and another portion of the optical member 600 may be supported by the bottom portion 100L-B, such as a portion of the incline portion 100L-B2 of the lower protective member 100L. The optical member 600 may be divided along the second direction DY into a mirror reflection area MR, a boundary area BR, and a diffusion reflection area DR.

The mirror reflection area MR is disposed adjacent to the light source 500 and supported by the first guide portion 420. The optical member 600 includes a mirror reflection material in the mirror reflection area MR, e.g., a reflective metallic material, such as, for example, aluminum (AL), gold (Au), silver (Ag), etc.

According to exemplary embodiments, a distance between the mirror reflection area MR and the display panel 200 increases as the mirror reflection area MR extends in the second direction DY. The mirror reflection area MR is configured to specularly reflect incident light to travel in the second direction DY.

The diffusion reflection area DR is configured to diffusively reflect incident light to guide the incident light in the third direction DZ. In this manner, the incident light may be directly provided from the light source 500 to the display panel 200 or provided after being reflected by the guide member 400 or the optical sheet 300. The optical member 600 includes a diffusion reflection material in the diffusion reflection area DR, such as for example, a polymer containing dye or pigment of white color.

According to exemplary embodiments, the definition of "the mirror reflection area MR specularly reflects incident light" means a ratio of the specular reflection is relatively higher than the diffusive reflection in the mirror reflection area MR. Further, according to exemplary embodiments, the definition of "the diffusion reflection area DR diffusively reflects incident light" means a ratio of the diffusion reflection is relatively higher than the specular reflection in the diffusion reflection area DR. That is, more specular reflection occurs in the mirror reflection area MR than diffusion reflection, and more diffusion reflection occurs in the diffusion reflection area DR than specular reflection.

The boundary area BR is disposed between the mirror reflection area MR and the diffusion reflection area DR. The boundary area BR is overlapped by a boundary between the plane portion 100L-B1 of the bottom portion 100L-B and the inclined portion 100L-B2 of the lower protective member 100L. The optical member 600 is bent in the boundary area BR.

A plurality of mirror reflection patterns MP and a plurality of diffusion reflection patterns DP are disposed in the boundary area BR. The mirror reflection patterns MP specularly reflect incident light and the diffusion reflection patterns DP diffusively reflect incident light.

The mirror reflection patterns MP have a width W1 that decreases as individual mirror reflection patterns MP extend in the second direction DY away from the body portion 410. The diffusion reflection patterns DP have a width W2 that increases as individual diffusion reflection patterns DP extend in the second direction DY away from the body portion 410. Accordingly, an amount of light diffusively reflected is increased, and an amount of the light specularly reflected is decreased as the respective mirror reflection patterns MP and respective diffusion reflection patterns DP extend in the second direction DY away from the body portion 410.

As shown in FIG. 3, the mirror reflection patterns MP have a sawtooth shape (or an isosceles triangular shape) that engages with the diffusion reflection patterns DP having a corresponding sawtooth shape. It is contemplated, however, that the shapes of the mirror reflection patterns MP and the diffusion reflection patterns DP may have various alternative configurations, such as described below in association with FIGS. 7A-7F.

The mirror reflection patterns MP are alternately arranged with the diffusion reflection patterns DP along the first direction DX. Thus, an amount of light specularly reflected and an amount of light diffusively reflected may be similar to each other in an area between a first point of the boundary area BR and a second point of the boundary area BR, which is spaced apart from the first point in the first direction DX.

Figure 4:
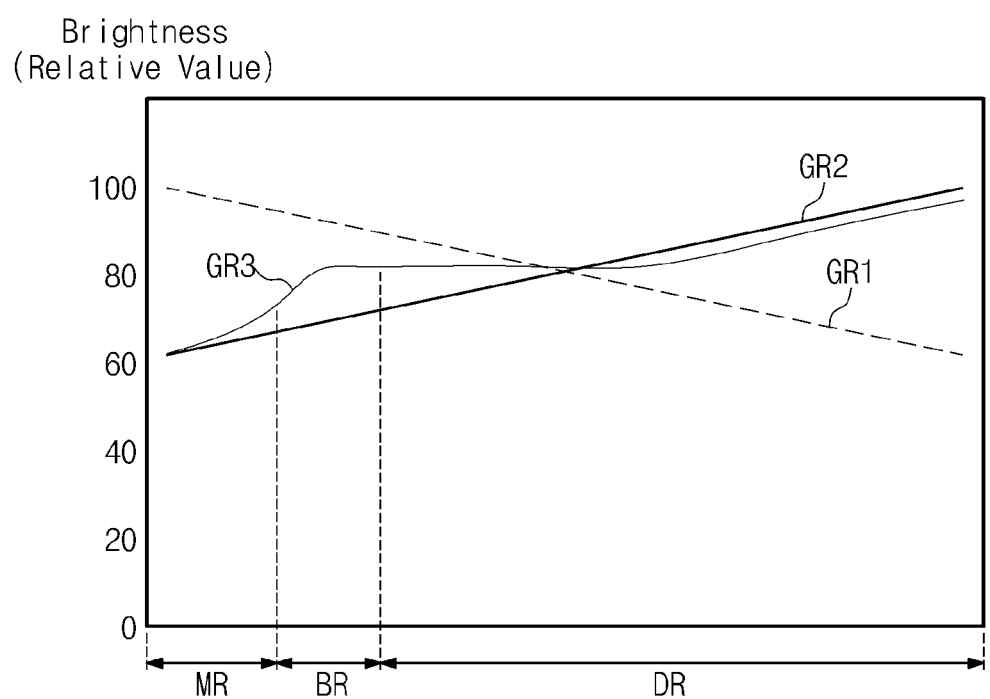
FIG. 4 is a graph comparing brightness of light versus portions of an optical member of a display panel, according to exemplary embodiments.

FIG. 4 is a graph comparing brightness of light versus portions of an optical member of a display panel, according to exemplary embodiments. In FIG. 4, a first graph GR1 represents brightness of a display device employing an optical member formed of only a diffusion reflection material, a second graph GR2 represents brightness of a display device employing an optical member formed of only a specular reflection material, and a third graph GR3 represents brightness of the display device as described in association with FIGS. 1-3.

According to the first graph GR1, brightness decreases as a distance from body portion 410 increases in the second direction DY. This is because light emitted from the light source 500 travels to the display panel 200 after being incident to the optical member formed of only the diffusion reflection material. The amount of light guided in the second direction DY is relatively small as compared to the amount of light emitted from the light source 500.

According to the second graph GR2, the brightness increases as a distance from body portion 410 increases in the second direction DY. However, the amount of light provided to the display panel 200 from the area adjacent to the light source 500 is very small. This is because light incident to the optical member formed of only the specular reflection material is guided only to the second direction DY without exiting to the display panel 200. Consequently, the display devices according to the first and second graphs GR1 and GR2 display an image in which brightness is non-uniform across areas of the image.

According to the third graph GR3, the brightness of the display device according to exemplary embodiments is higher than the brightness represented by the second graph GR2 in the boundary area BR. This is because the light is provided to the display panel 200 from the diffusion reflection patterns DP arranged in the boundary area BR. Since light is guided to the second direction DY by the mirror reflection patterns MP arranged in the boundary area BR, the brightness represented by the third graph GR3 is similar to the brightness represented by the second graph GR2 in the diffusion reflection area DR. As described above, the display device according to exemplary embodiments may display an image with the uniform brightness as compared to those of the display devices according to the first and second graphs GR1 and GR2.

Figure 5A:
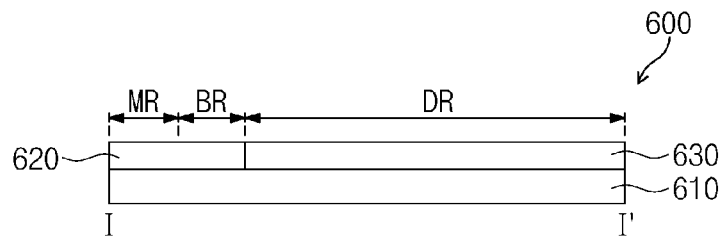
FIGS. 5A and 5B are cross-sectional views of the optical member of FIG. 3 respectively taken along sectional lines I-I' and II-II', according to exemplary embodiments.
Figure 5B:
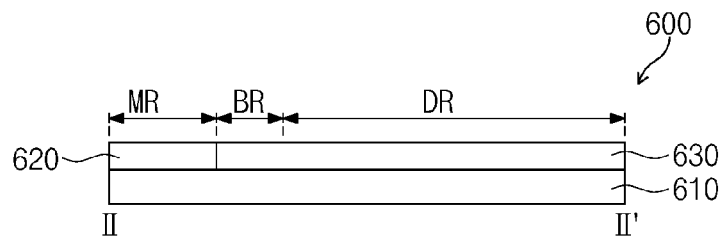

FIGS. 5A and 5B are cross-sectional views of the optical member of FIG. 3 respectively taken along sectional lines I-I' and II-II', according to exemplary embodiments. Hereinafter, the optical member of FIG. 3 will be described in detail with reference to FIGS. 5A and 5B.

The optical member 600 includes a base member 610, a mirror reflection member 620, and a diffusion reflection member 630. The base member 610 is disposed in the mirror reflection area MR, the boundary area BR, and the diffusion reflection area DR. The base member 610 may be a flexible sheet and formed of a plastic resin or any other suitable material.

The mirror reflection member 620 includes the mirror reflection material. A portion of the mirror reflection member 620 is disposed in the mirror reflection area MR of the base member 610 and the other portion of the mirror reflection member 620 is disposed in the boundary area BR of the base member 610 to form the mirror reflection patterns MP. The mirror reflection member 620 may be a metal layer coated on a surface of the base member 610 or a metal sheet attached to the surface of the base member 610. Any suitable technique, however, may be used to form the mirror reflection member 620 on the base member 610.

The diffusion reflection member 630 includes the diffusion reflection material. A portion of the diffusion reflection member 630 is disposed in the diffusion reflection area DR of the base member 610 and the other portion of the diffusion reflection member 630 is disposed in the boundary area BR of the base member 610 to form the diffusion reflection patterns DP. The diffusion reflection member 630 may be a colored layer coated on the surface of the base member 610 or a colored sheet attached to the surface of the base member 610. Any suitable technique, however, may be used to form the diffusion reflection member 630 on the base member 610.

Figure 6A:
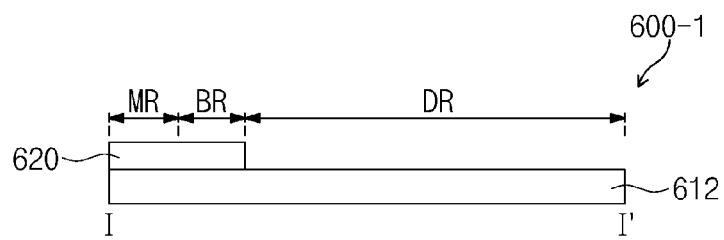
FIGS. 6A and 6B are cross-sectional views of an optical member, according to exemplary embodiments.
Figure 6B:
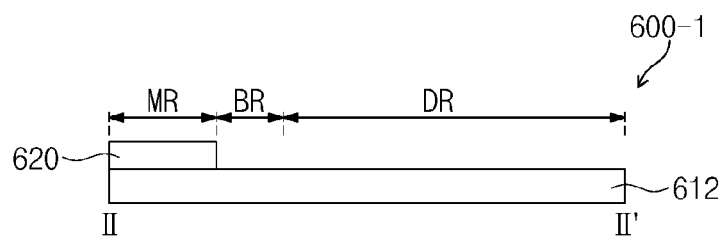

FIGS. 6A and 6B are cross-sectional views of an optical member, according to exemplary embodiments.

The optical member 600-1 includes a base member 612 and a mirror reflection member 620. The base member 612 may be a colored flexible layer. When the base member 612 is manufactured, a white dye or pigment may be added to the plastic resin.

A portion of the mirror reflection member 620 is disposed in the mirror reflection area MR of the base member 612 and the other portion of the mirror reflection member 620 is disposed in the boundary area BR of the base member 612 to form the mirror reflection patterns MP.

Exposed portions of the base member 612 in the boundary area BR form the diffusion reflection patterns DP.

According to exemplary embodiments, however, the base member 612 may be a metal sheet and a diffusion reflection member may be disposed in the diffusion reflection area DR of the metal sheet. In addition, portions of the diffusion reflection member are disposed in the boundary area BR of the metal sheet to form the diffusion reflection patterns. As such, portions of the metal sheet that are exposed in the boundary area BR form the mirror reflection patterns.

FIGS. 7A-7F are plan views of optical members, according to exemplary embodiments. In FIGS. 7A-7F, detailed descriptions of like elements illustrated and described in association with FIG. 3 will be omitted to avoid obscuring exemplary embodiments described herein. In addition, configurations of optical members 600-2 to 600-7 shown in FIGS. 7A-7F may be similar to the optical member 600 shown in FIGS. 5A and 5B and the optical member 600-1 shown in FIGS. 6A and 6B.

Figure 7A:
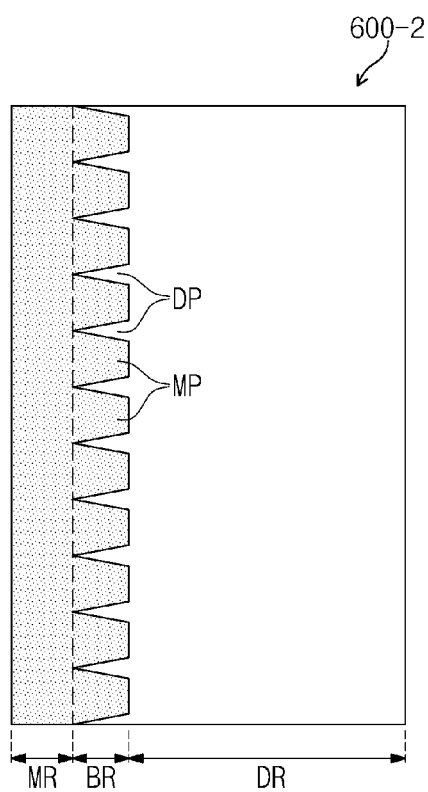
FIGS. 7A-7F are plan views of optical members, according to exemplary embodiments.

Referring to FIG. 7A, each of the mirror reflection patterns MP of the optical member 600-2 have the sawtooth shape, in which a vertex portion of the sawtooth shape is cut, e.g., truncated, before reaching a point. In this manner, the diffusion reflection patterns DP may have a triangular shape, such that the diffusion reflection patterns DP are engaged with the mirror reflection patterns MP.

Figure 7B:
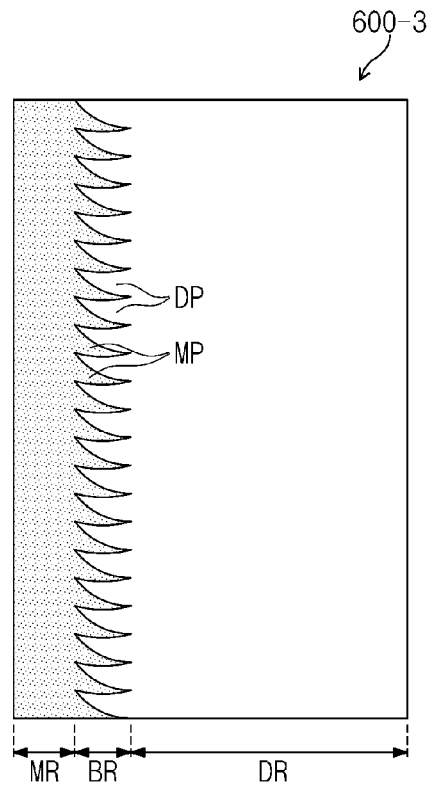

Referring to FIG. 7B, the mirror reflection patterns MP of the optical member 600-3 have a curved (or otherwise arcuate) sawtooth shape of a first maximum thickness. To this end, the diffusion reflection patterns DP may also have a curved (or otherwise arcuate) sawtooth shape, which may be of a second maximum thickness. It is contemplated, however, that the curved sawtooth shapes of the mirror reflection patterns MP and the diffusion reflection patterns DP may be of a same thickness. In any event, the diffusion reflection patterns DP are engaged with the mirror reflection patterns MP.

Figure 7C:
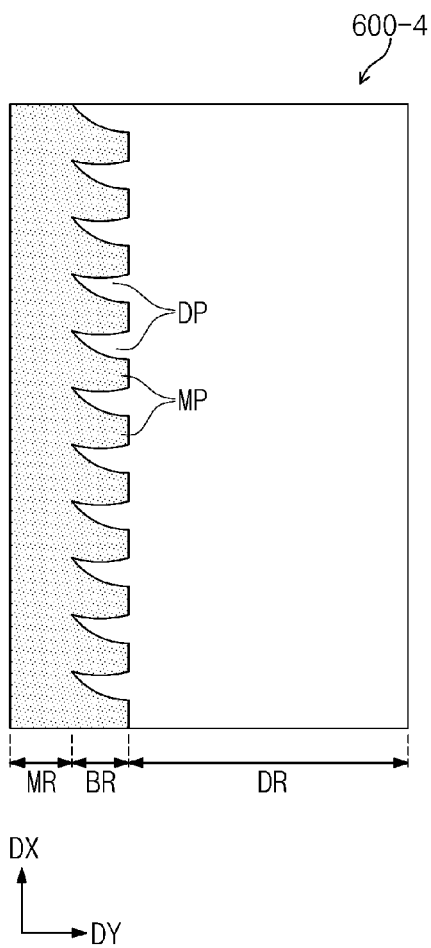

Referring to FIG. 7C, the mirror reflection patterns MP of the optical member 600-4 each have a curved sawtooth shape, in which a vertex portion of the sawtooth shape is cut, e.g., truncated, before reaching a point. In this manner, the diffusion reflection patterns DP may have a curved sawtooth shape. It is noted that a maximum thickness of the mirror reflection patterns MP may be larger than a maximum thickness of the diffusion reflection patterns DP. Again, the diffusion reflection patterns DP are engaged with the mirror reflection patterns MP.

Figure 7D:
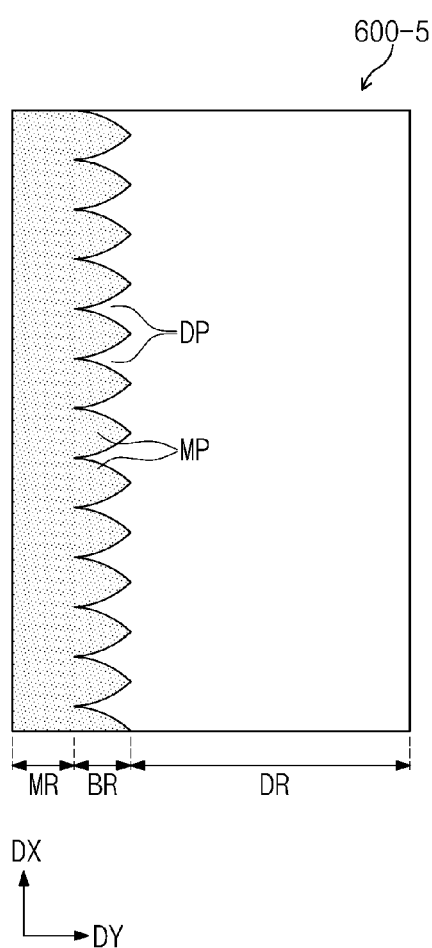

Referring to FIG. 7D, the mirror reflection patterns MP of the optical member 600-5 each have an ellipse (or spade) shape, which is cut along a short axis thereof. In this manner, the diffusion reflection patterns DP each have a shape configured to be engaged with the mirror reflection patterns MP. It is noted that a maximum thickness of the mirror reflection patterns MP may be larger than a maximum thickness of the diffusion reflection patterns DP.

Figure 7E:
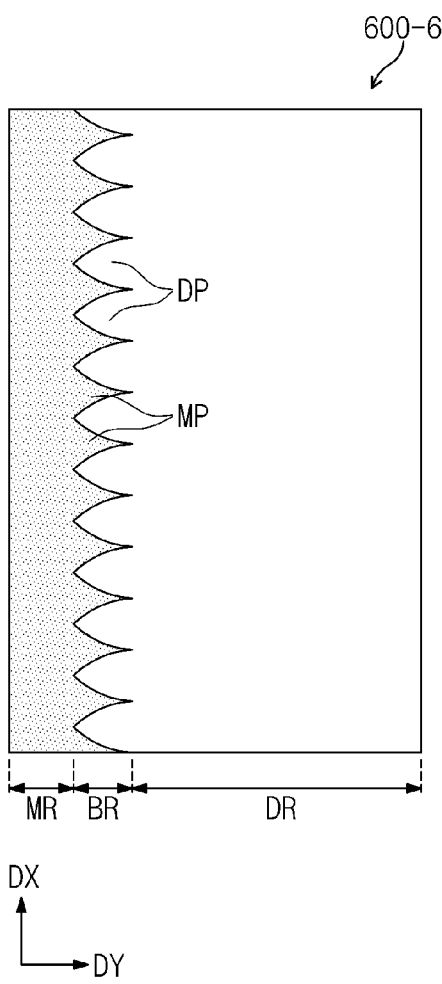

Referring to FIG. 7E, the optical member 600-6 includes the mirror reflection patterns MP each of which have the same shape as the diffusion reflection patterns DP shown in FIG. 7D, and each of the diffusion reflection patterns DP have the same shape as the mirror reflection patterns MP shown in FIG. 7D. That is, the shapes of the mirror reflection patterns MP and the diffusions reflection patterns of FIG. 7E are reversed from the configuration illustrated and described in association with FIG. 7D. As such, a maximum thickness of the mirror reflection patterns MP may be smaller than a maximum thickness of the diffusion reflection patterns DP.

Figure 7F:
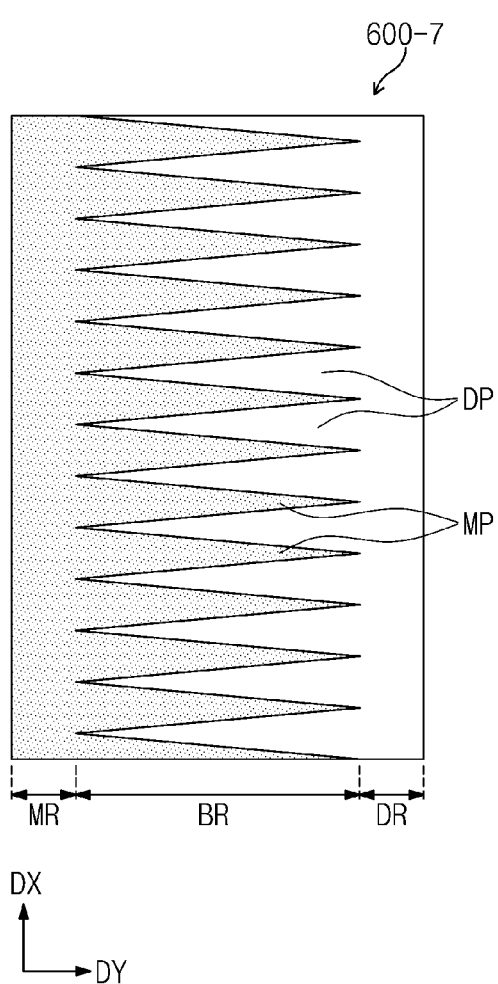

Referring to FIG. 7F, the optical member 600-7 includes the mirror reflection patterns MP that each have a sawtooth shape longer (e.g., extends further in the second direction DY) than the mirror reflection patterns MP of the optical member 600 shown in FIG. 3. As such, the width in the second direction DY of the boundary area BR may be increased in correspondence with a length of the mirror reflection patterns MP. In addition, the diffusion reflection patterns DP have the sawtooth shape with a same length as the mirror reflection patterns MP. As such, the diffusion reflection patterns DP are engaged with the mirror reflection patterns MP.

Figure 8A:
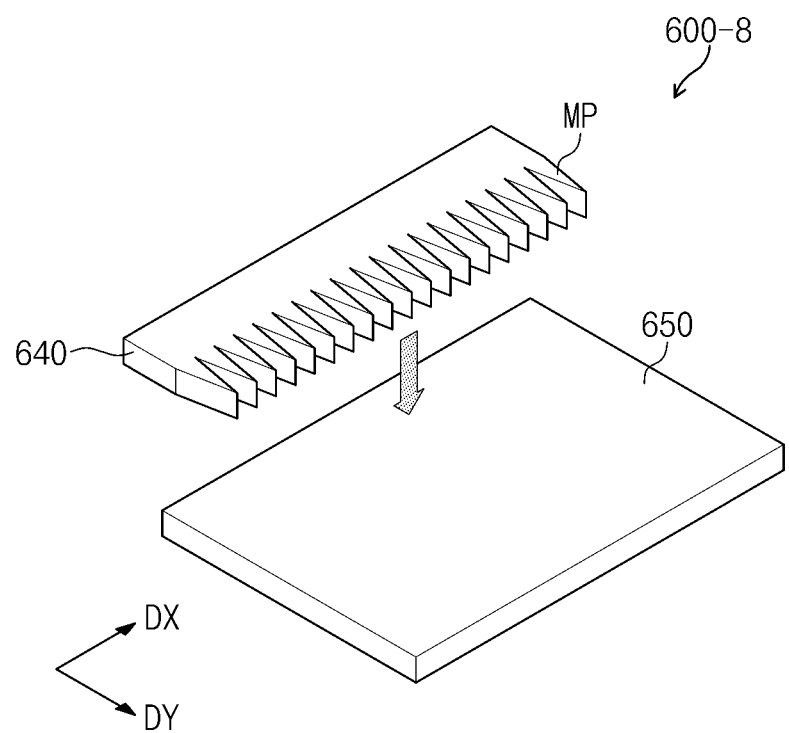
FIG. 8A is an exploded perspective view of an optical member, according to exemplary embodiments.
Figure 8B:
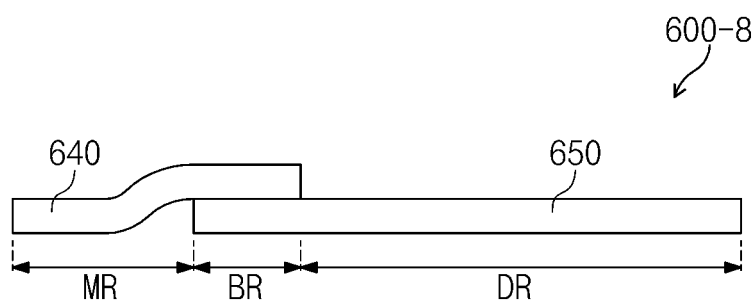
FIG. 8B is a side view of an optical member, according to exemplary embodiments.

FIG. 8A is an exploded perspective view of an optical member, according to exemplary embodiments. FIG. 8B is a side view of an optical member, according to exemplary embodiments.

Referring to FIGS. 8A and 8B, an optical member 600-8 includes a mirror reflection member 640 and a diffusion reflection member 650. The mirror reflection member 640 is a sheet including a mirror reflection material, e.g., aluminum (Al), gold (Au), silver (Ag), etc., and the diffusion reflection member 650 is a sheet including a diffusion reflection material, such as a plastic resin in which dye or pigment is distributed.

The diffusion reflection member 650 is disposed in the boundary area BR and the diffusion reflection area DR. A portion of the mirror reflection member 640 is disposed in the mirror reflection area MR and the other portion of the mirror reflection member 640 is disposed to overlap with a portion of the diffusion reflection member 650 disposed in the boundary area BR. In the boundary area BR, the other portion of the mirror reflection member 640 may be coupled to at least a portion of the diffusion reflection member 650 via an adhesive member (not shown).

The other portion of the mirror reflection member 640 disposed on the diffusion reflection member 650 may include the mirror reflection patterns MP. The mirror reflection patterns MP may have the sawtooth shape as shown in FIG. 8A, but the mirror reflection patterns MP are not be limited to the sawtooth shape. That is, the mirror reflection patterns MP may have various shapes, such as shown in FIGS. 7A-7F, or any other suitable pattern. Exposed portions of the diffusion reflection member 650 in the boundary area BR form the diffusion reflection patterns (not shown).

FIGS. 9A-9D are plan views of a diffusion reflective member of the optical member of FIGS. 8A and 8B, according to exemplary embodiments.

As shown in FIGS. 9A-9D, the diffusion reflection members 650-1 to 650-4 include sub-reflection patterns SMP1 to SMP4, respectively. The sub-reflection patterns SMP1 to SMP4 guide incident light to the second direction DY. In each of the optical members respectively including the diffusion reflection members 650-1 to 650-4, the mirror reflection area MR has a width smaller than that of the optical member 600-8, shown in FIGS. 8A and 8B, in the second direction DY.

The sub-reflection patterns SMP1-SMP4 include a material having a mirror reflectivity higher than that of the diffusion reflection members 650-1 to 650-4. The sub-reflection patterns SMP1 to SMP4 may include the metallic material, e.g., aluminum (Al), gold (Au), silver (Ag), etc.

Figure 9C:
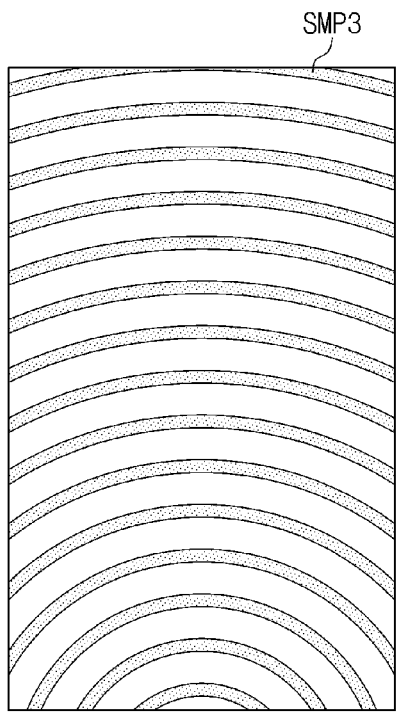
Figure 9C:
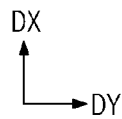
Figure 9D:
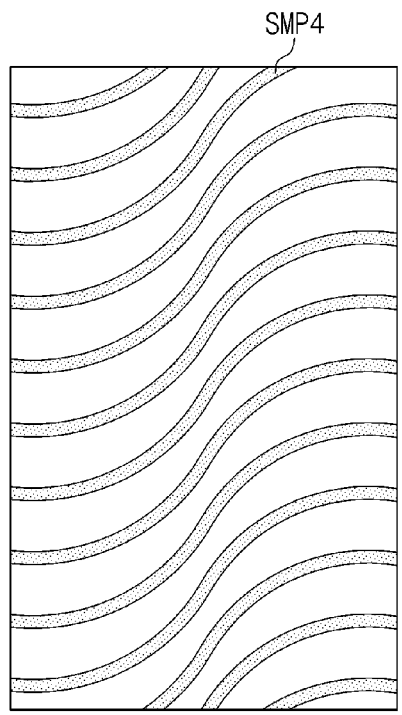
Figure 9D:
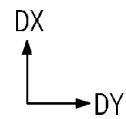

Referring to FIG. 9A, the sub-reflection patterns SMP1 may have an isosceles triangular shape extended in the second direction DY. Referring to FIG. 9B, the sub-reflection patterns SMP2 may have a stripe shape extended in the second direction DY. Referring to FIG. 9C, the sub-reflection patterns SMP3 may have a curved shape extended in the second direction DY. In this manner, a bend radius of the various sub-reflection patterns SMP3 may increase with an increasing distance in the first direction. That is, the various sub-reflection patterns may define portions of concentric circles. Different from the shape shown in FIG. 9C, the sub-reflection patterns SMP3 may have the same arcuate shape. Referring to FIG. 9D, a part of the sub-reflection patterns SMP4 may have a three-dimensional curved shape, and the shape of the sub-reflection patterns SMP4 may or may not be uniform.

Figure 10A:
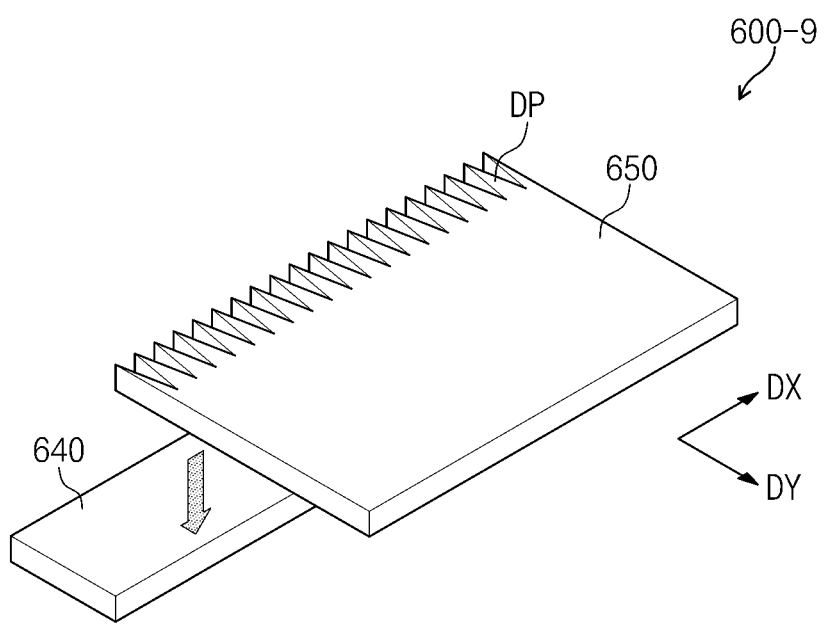
FIG. 10A is an exploded perspective view of an optical member, according to exemplary embodiments.
Figure 10B:
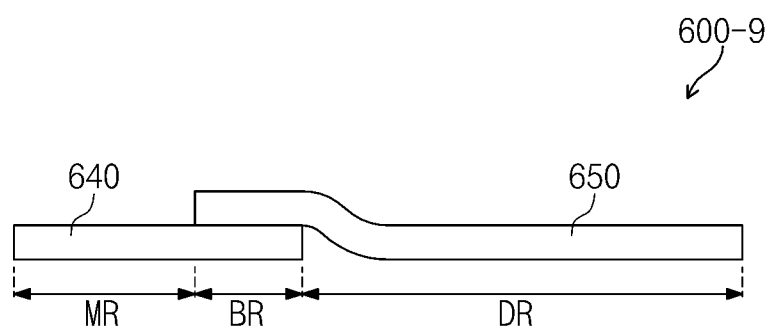
FIG. 10B is a side view of an optical member, according to exemplary embodiments.

FIG. 10A is an exploded perspective view of an optical member, according to exemplary embodiments. FIG. 10B is a side view of an optical member, according to exemplary embodiments. In FIGS. 10A and 10B, detailed descriptions of like elements of the optical member illustrated and described in association with the optical member of FIGS. 8A and 8B will be omitted to avoid obscuring exemplary embodiments described herein.

Referring to FIGS. 10A and 10B, the mirror reflection member 640 is disposed in the mirror reflection area MR and the boundary area BR. A portion of the diffusion reflection member 650 is disposed in the diffusion reflection area DR and the other portion of the diffusion reflection member 650 is disposed to overlap the mirror reflection member 640 in the boundary area BR.

The portion of the diffusion reflection member 650 disposed on the mirror reflection member 640 forms the diffusion reflection patterns DP. The diffusion reflection patterns DP have a sawtooth shape, as shown in FIG. 10A; however, any other suitable shape may be utilized, such as described in association with FIGS. 7A-7F. In this manner, the width of the diffusion reflection patterns DP in the first direction DX increases from a point as the diffusion reflection pattern DP extends in the second direction DY away from the mirror reflection member 640. Exposed portions of the mirror reflection member 640 in the boundary area BR form the mirror reflection patterns (not shown). It is noted that the diffusion reflection member 650 shown in FIGS. 10A and 10B may further include the sub-reflection patterns, such as shown in FIGS. 9A-9D.

Figure 11:
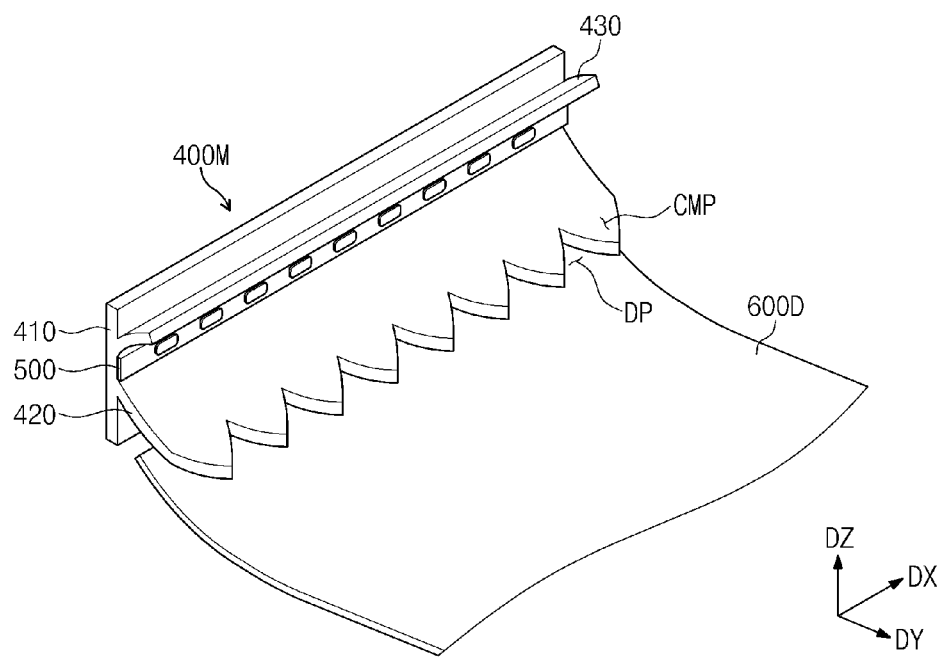
FIG. 11 is a perspective view of a portion of a display device, according to exemplary embodiments.
Figure 12:
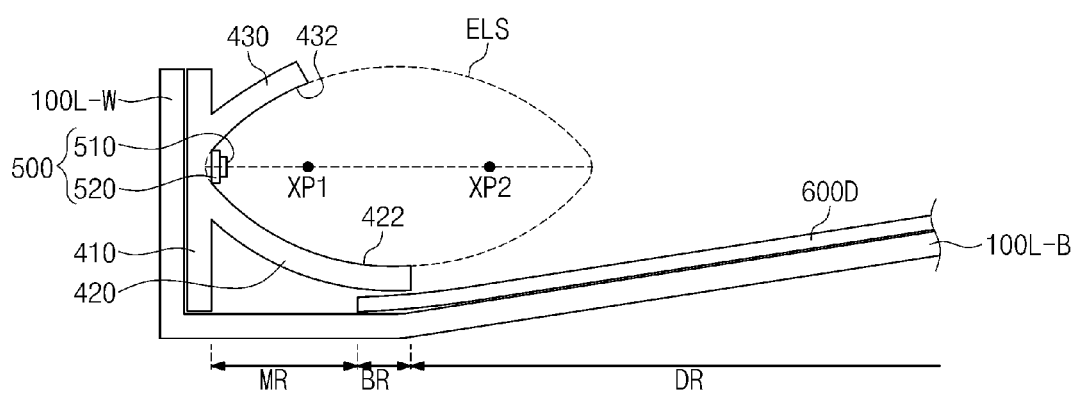
FIG. 12 is a side view of the portion of the display device of FIG. 11, according to exemplary embodiments.

FIG. 11 is a perspective view of a portion of a display device, according to exemplary embodiments. FIG. 12 is a side view of the portion of the display device of FIG. 11. Hereinafter, detailed descriptions of like elements of the display device as those of the display device shown in FIGS. 1-3 will be omitted to avoid obscuring exemplary embodiments described herein.

Referring to FIGS. 11 and 12, a guide member 400M is configured to support the light source 500. The guide member 400M includes a body portion 410, a first guide portion 420, and a second guide portion 430.

According to exemplary embodiments, the guide member 400M may be configured to directly receive light from the light source 500, which is different from the guide member 400 shown in FIGS. 1 and 2. The guide member 400M is also configured to specularly reflect light to guide the light in the second direction DY. In exemplary embodiments, the guide member 400M is referred to as a mirror reflection guide member, and the first and second guide portions 420 and 430 are referred to as first and second reflection portions 420 and 430, respectively. According to exemplary embodiments, the second reflection portion 430 may be omitted.

The first reflection portion 420 includes a first reflection surface 422 and the second reflection portion 430 includes a second reflection surface 432 facing the first reflection surface 422 in the third direction DZ. To specularly reflect incident light, the first and second reflection portions 420 and 430 include the mirror reflection material, e.g., aluminum (Al), gold (Au), silver (Ag), etc.

The first and second reflection portions 420 and 430 may include metallic layers disposed on surfaces thereof. That is, the metallic layers may form the first and second reflection surfaces 422 and 432.

The first reflection portion 420 includes cut away portions CMP formed by cutting portions of the first reflection portion 420. It is noted; however, that the cut away portions CMP may be formed as such during a fabrication process. The cut away portions CMP correspond to the mirror reflection patterns shown in FIG. 3. Widths of the cut away patterns CMP decrease as they extend in the second direction DY toward the body portion 410. The shape of the cut away patterns CMP may be changed, such as, in accordance with, one or more of the shapes described in association with FIGS. 7A-7F.

The width of the boundary area BR in the second direction DY is determined by a length of the cut away patterns CMP in the second direction DY, and the width of the mirror reflection area MR in the second direction DY is determined by a length of the first reflection portion 420 in the second direction DY, except for the portion of the first reflection portion 420 corresponding to the cut away patterns CMP.

According to exemplary embodiments, the optical member 600D does not include the mirror reflection patterns MP, such as shown in FIGS. 1-3. The optical member 600D, however, is configured to diffusively reflect light provided from the light source 500. As such, the optical member 600D may be referred to as a diffusion reflection member.

A portion of the diffusion reflection member 600D is overlapped with a portion of the first reflection portion 420. The cut away patterns CMP of the first reflection portion 420 are disposed on the diffusion reflection member 600D in the boundary area BR. The portions of the diffusion reflection member 600D exposed in the boundary area BR form the diffusion reflection patterns DP.

As shown in FIG. 12, the first and second reflection surfaces 422 and 432 may be formed about an imaginary ellipse ELS in a cross section taken along the third direction DZ to improve the "straightness" of light reflected by the first and second reflection surfaces 422 and 432. The light source 500 is disposed on a long axis line of the ellipse ELS. The long axis line is obtained by connecting focuses XP1 and XP2 of the ellipse ELS. In this manner, light reflected by the first and second reflection surfaces 422 and 432 may be substantially parallel to the display panel 200 while traveling in the second direction DY.

Figure 13:
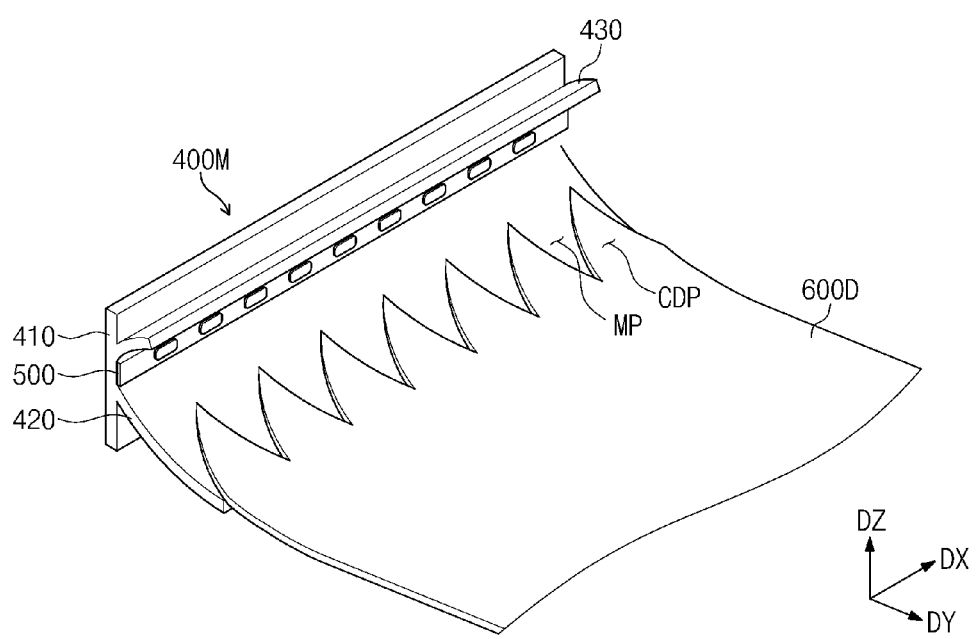
FIG. 13 is a perspective view of a portion of a display device, according to exemplary embodiments.

FIG. 13 is a perspective view of a portion of a display device, according to exemplary embodiments. In FIG. 13, detailed descriptions of like elements of the display device as those of the display device shown in FIGS. 11 and 12 will be omitted to avoid obscuring exemplary embodiments described herein.

Referring to FIG. 13, the mirror reflection guide member 400M is configured to support the light source 500. The mirror reflection guide member 400M includes the body portion 410, the first reflection portion 420, and the second reflection portion 430. While not illustrated, the first reflection portion 420 includes a first reflection surface 422 and the second reflection portion 430 includes a second reflection surface 432 facing the first reflection surface 422 in the third direction DZ.

The diffusion reflection member 600D includes cut away portions CDP formed by cutting portions of the diffusion reflection member 600D. It is noted; however, that the cut away portions CMP may be formed as such during a fabrication process. The cut away portions CDP correspond to the diffusion reflection patterns shown in FIG. 3. Widths of the cut away patterns CDP increase as they extend in the second direction DY away from the body portion 410.

A portion of the diffusion reflection member 600D is overlapped with the first reflection portion 420. The cut away patterns CMP of the diffusion reflection portion 600D are disposed on the first reflection portion 420 in the boundary area BR. The portions of the first reflection portion 420 exposed in the boundary area BR form the mirror reflection patterns MP.

Figure 14:
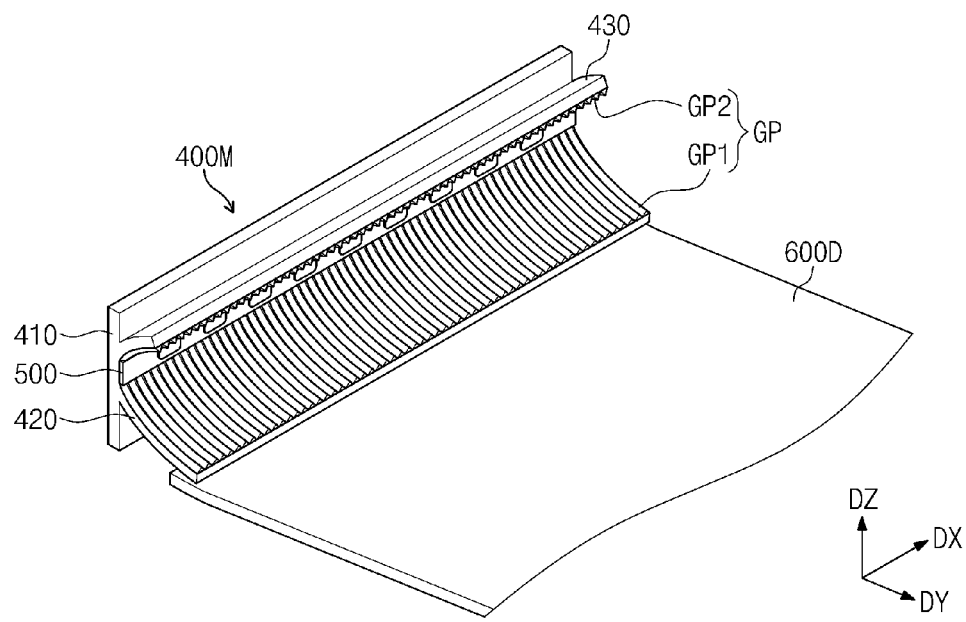
FIG. 14 is a perspective view showing a portion of a display device, according to exemplary embodiments.
Figure 15:
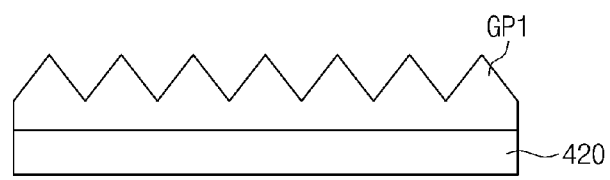
FIG. 15 is a cross-sectional view of a portion of a mirror reflective guide member, according to exemplary embodiments.

FIG. 14 is a perspective view of a portion of a display device, according to exemplary embodiments. FIG. 15 is a cross-sectional view of a portion of a mirror reflective guide member, according to exemplary embodiments. FIG. 15 shows the cross section of the first reflection portion 420 when viewed in the first direction DX. Hereinafter, detailed descriptions of like elements of the display device as those of the display device shown in FIGS. 11-13 will be omitted to avoid obscuring exemplary embodiments described herein.

Referring to FIGS. 14 and 15, the mirror reflection guide member 400M is configured to support the light source 500. The mirror reflection guide member 400M includes the body portion 410, the first reflection portion 420, and the second reflection portion 430.

The mirror reflection guide member 400M includes a plurality of guide patterns GP disposed in the first and second reflection portions 420 and 430. The guide patterns GP include first guide patterns GP1 disposed on the first reflection portion 420 and second reflection patterns GP2 disposed on the second reflection portion 430. According to exemplary embodiments, the first guide patterns GP1 or the second guide patterns GP2 may be omitted.

The guide patterns GP are extended in the second direction DY and arranged in the first direction DX. As shown in FIGS. 14 and 15, the first guide patterns GP1 may be prism-shaped patterns disposed on the first reflection surface 422. It is noted that the first reflection surface 422 was previously described in association with FIG. 11. The prism patterns may be manufactured by coupling a prism sheet to the first reflection surface 422. Additionally or alternatively, the prism patterns may be deposited or otherwise formed on the first reflection surface 422.

Portions of the first reflection portion 420 are overlapped by portions of the diffusion reflection member 600D. As shown in FIG. 14, the portions of the first reflection portion 420 are disposed on the portions of the diffusion reflection member 600D. In this manner, the boundary area BR corresponds to the area in which the portions of the first reflection portion 420 are overlapped by the portions of the diffusion reflection member 600D.

Although not shown, the cut away patterns CMP and CDP (as previously described in association with FIGS. 11 and 13) may be disposed in the boundary area BR. In addition, the second guide patterns GP2 may have the same shape as the first guide patterns GP1. Further, the prism shape of the first guide patterns GP1 may be changed.

Figure 16:
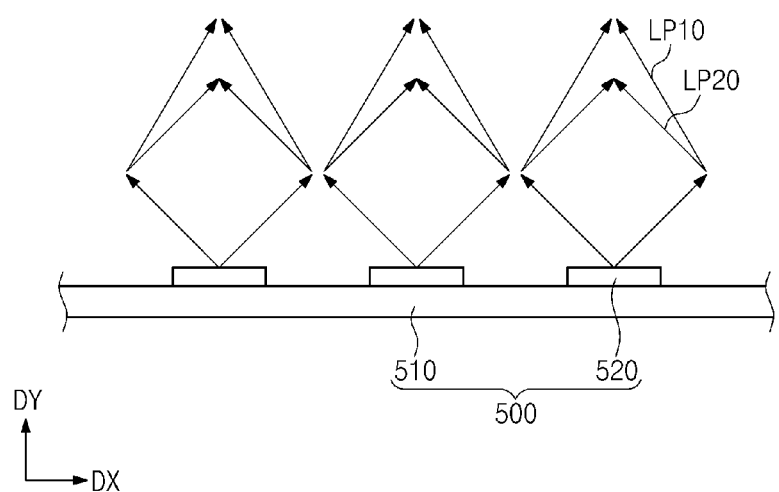
FIGS. 16 and 17 illustrate paths of light guided by a mirror reflective guide member, according to exemplary embodiments.
Figure 17:
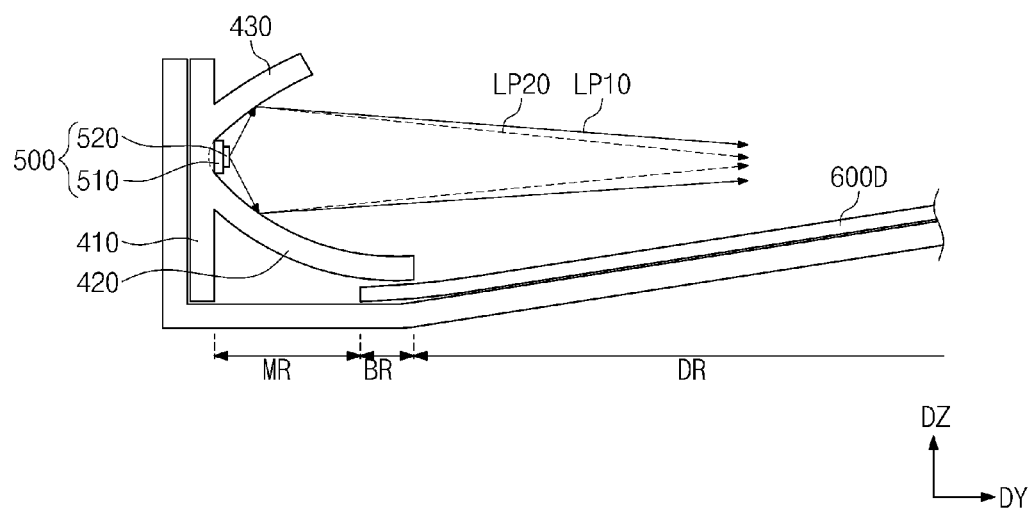

FIGS. 16 and 17 illustrate paths of light guided by a mirror reflective guide member, according to exemplary embodiments. FIG. 16 shows paths of light when viewed in a surface formed by the first and second directions DX and DY. FIG. 17 shows paths of light when viewed in a surface formed by the second and third directions DY and DZ. In FIG. 17, the guide patterns GP have been omitted.

In FIGS. 16 and 17, a first path LP10 represents a path of light when the light is generated by the light emitting devices 520 enters into the guide patterns GP and a second path LP20 represents the path of light when the light generated by the light emitting devices 520 dose not enter into the guide patterns GP.

The light guide patterns GP are transparent. The light guide patterns GP may be formed of a transparent plastic resin. Light entered into the light guide patterns GP travels through an inside region of the guide patterns GP. A portion of the light traveling through the inside region of the guide patterns GP exits to the exterior of the guide patterns GP.

The light exiting to the exterior while traveling through the inside region of the guide patterns GP is more shifted in the second direction DY than light traveling in the second path LP20. Consequently, the straightness of the first path LP10 is higher than the straightness of the second path LP20. Thus, the mirror reflection guide member 400M including the guide patterns GP may effectively guide the light in the second direction DY more than that of the mirror reflection guide member not including the guide patterns GP.

Figure 18:
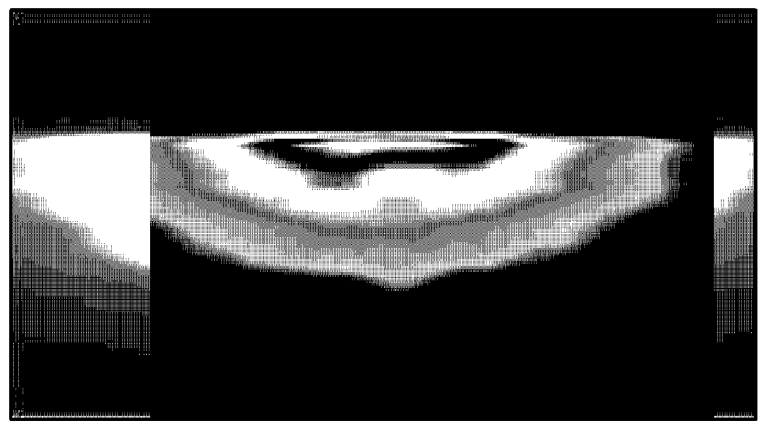
FIG. 18 illustrates light reflected by a mirror reflective guide member in which guide patterns are not formed, according to exemplary embodiments.
Figure 19:
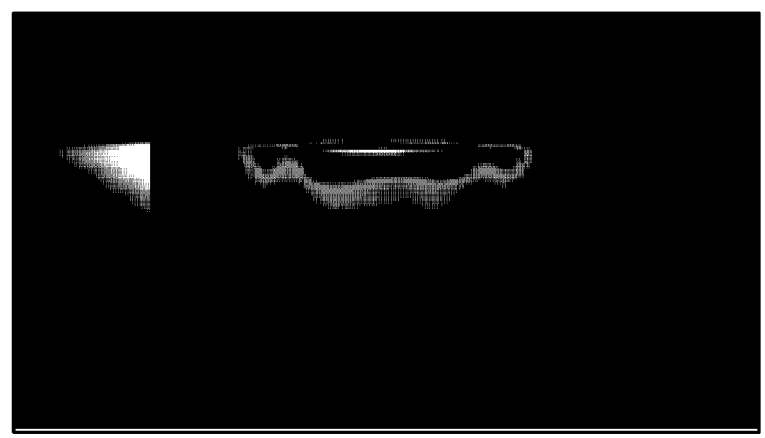
FIG. 19 illustrates light reflected by a mirror reflective guide member in which guide patterns are formed on a first reflective portion, according to exemplary embodiments.
Figure 20:
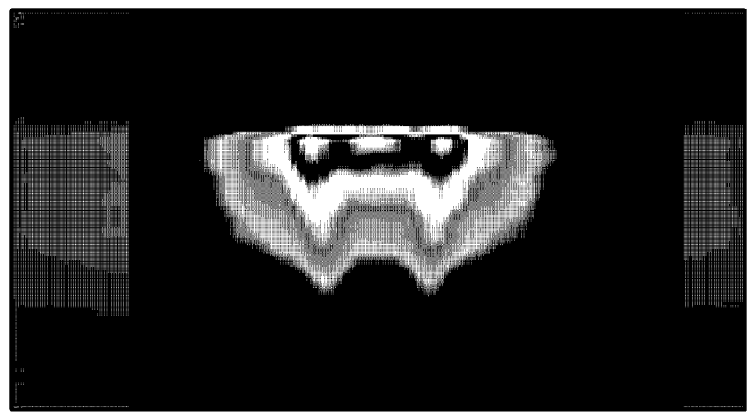
FIG. 20 illustrates light reflected by a mirror reflective guide member in which guide patterns are formed on a second reflective portion, according to exemplary embodiments.
Figure 20:
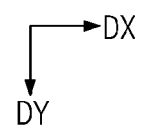
Figure 21:
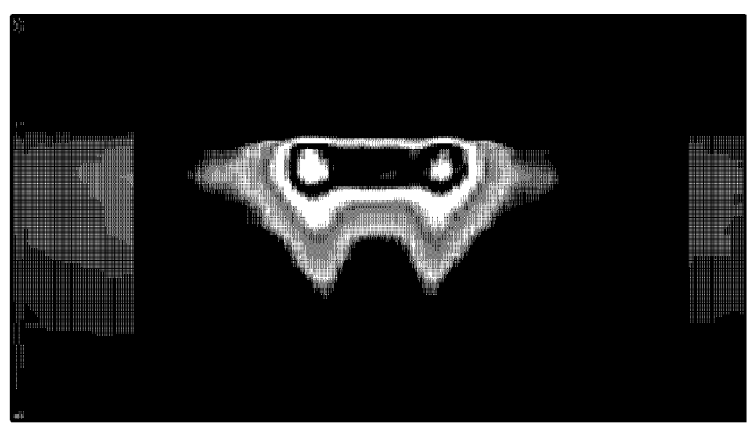
FIG. 21 illustrates light reflected by a mirror reflective guide member in which guide patterns are formed on first and second reflective portions, according to exemplary embodiments.
Figure 21:
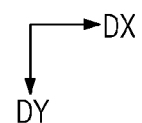

FIG. 18 illustrates light reflected by a mirror reflective guide member in which guide patterns are not formed, according to exemplary embodiments. FIG. 19 illustrates light reflected by a mirror reflective guide member in which guide patterns are formed on a first reflective portion. FIG. 20 illustrates light reflected by a mirror reflective guide member in which guide patterns are formed on a second reflective portion. FIG. 21 illustrates light reflected by a mirror reflective guide member in which guide patterns are formed on first and second reflective portions. FIGS. 18-21 illustrate the path of light generated by one light emitting device.

Referring to FIGS. 19-21, the light reflected by the mirror reflection guide member including the guide patterns has improved straightness as compared to that of the light shown in FIG. 18. As shown in FIG. 21, the straightness of the light reflected by the mirror reflection guide member 400M including the first guide patterns GP1 (described in association with FIG. 14) and the second guide patterns GP2 (described in association with FIG. 14) was highest.

Figure 22:
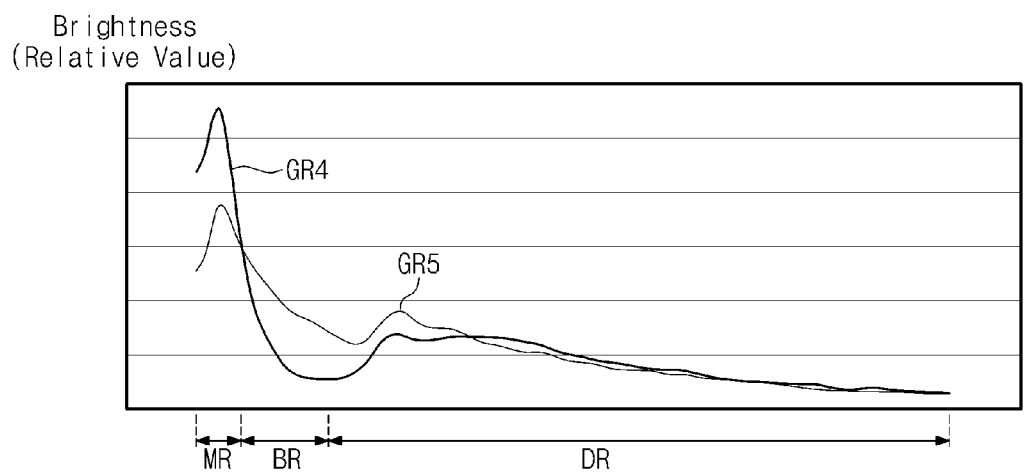
FIG. 22 is a graph comparing brightness of light guided by mirror reflective guide members versus portions of an optical member of a display panel, according to exemplary embodiments.

FIG. 22 is a graph comparing brightness of light guided by mirror reflective guide members versus portions of an optical member of a display panel according to exemplary embodiments. In FIG. 22, a fourth graph GR4 represents brightness of a display device including an optical member in which the guide patterns are not formed and a fifth graph GR5 represents brightness of the display device including the mirror reflection guide member 400M with the first and second guide patterns GP1 and GP2 as described in association with FIG. 14.

As represented by the fifth graph GR5, the brightness of the boundary area BR and areas adjacent to the boundary area BR is higher than brightness of the boundary area BR and areas adjacent to the boundary area BR represented by the fourth graph GR4. This is because the portion of the light incident to the first guide patterns GP1 exits to the third direction DZ while traveling through the inside region of the first guide patterns GP1.

In other words, the increased brightness is a result of the amount of light provided to the display panel 200 from the first guide patterns GP1. Thus, the display device according to exemplary embodiments is configured to display images having more uniform brightness as compared to that of the display device according to the fourth graph GR4.

Figure 23A:
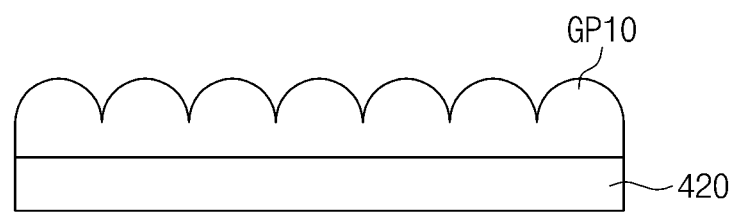
FIGS. 23A and 23B are cross-sectional views of a portion of mirror reflective guide members, according to exemplary embodiments.
Figure 23B:
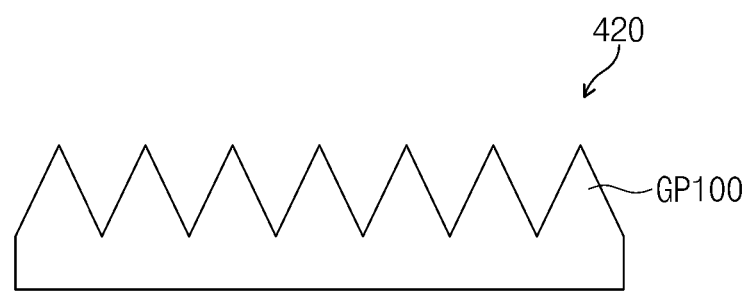

FIGS. 23A and 23B are cross-sectional views of a portion of mirror reflective guide members, according to exemplary embodiments. FIGS. 23A and 23B show cross sections like the cross-section illustrated in association with FIG. 15.

Referring to FIG. 23A, the first guide patterns GP10 may be lenticular patterns. The lenticular patterns are disposed on the first reflection surface 422 of the first guide portion 420. The lenticular patterns are substantially transparent. The lenticular patterns may be manufactured by coupling a lenticular sheet on the first reflection surface 422. It is also noted that the lenticular patterns may be formed to the first guide portion 420 during a manufacturing process.

Referring to FIG. 23B, the first guide patterns GP100 may be formed by removing portions of the first reflection portion 420. Accordingly, the first reflection surface 422 includes mountains and valleys repeatedly and alternately arranged with the mountains.

Figure 24:
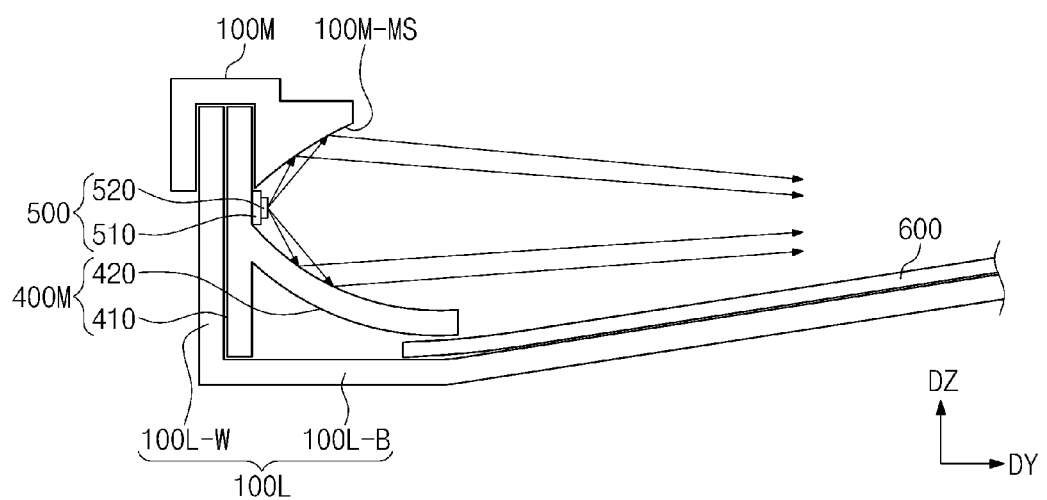
FIG. 24 is a cross-sectional view of a portion of a display device, according to exemplary embodiments.

FIG. 24 is a cross-sectional view of a portion of a display device, according to exemplary embodiments. FIG. 24 shows a portion of a display device like the cross section shown in FIG. 2. As shown in FIG. 24, the guide member 400M includes the body portion 410 and the first reflection portion 420. The second reflection portion 430 has been omitted.

The portion of the intermediate protective member 100M is disposed to be spaced apart from the first reflection portion 410 in the third direction DZ, and thus the portion of the intermediate protective member 100M covers the light source 500. The portion of the intermediate protective member 100M forms a reflection surface 100M-MS. The reflection surface 100M-MS of the intermediate protective member 100M forms the second reflective surface 432 shown in FIG. 17. The second guide patterns GP2 may be disposed on the reflection surface 100M-MS.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A display device, comprising:
   a light source extending in a first direction, the light source being configured to emit light;

an optical member configured to guide the light emitted from the light source; and a display panel disposed on the optical member, the display panel being configured to display an image using the light guided by the optical member, wherein the optical member comprises:

a mirror reflection area disposed adjacent to the light source, the mirror reflection area being configured to guide at least some of the light emitted from the light source to a second direction substantially perpendicular to the first direction, a diffusion reflection area spaced apart from the mirror reflection area in the second direction, the diffusion reflection area being configured to guide at least some of the light emitted from the light source to the display panel, and a boundary area disposed between the mirror reflection area and the diffusion reflection area, the boundary area comprising a plurality of mirror reflection patterns and a plurality of diffusion reflection patterns, wherein the diffusion reflection area comprises sub-reflection patterns configured to guide at least some of the light emitted from the light source in the second direction, the sub-reflection patterns being spaced apart from one another in the first direction, the sub-reflection patterns extending in the second direction, and wherein each of the sub-reflection patterns has a constant width or a width that decreases with increasing distance in the second direction from the light source.

2. The display device of claim 1, wherein the mirror reflection patterns comprise widths that decrease as the mirror reflection patterns extend in the second direction away from the light source.

3. The display device of claim 2, wherein the mirror reflection patterns are alternately arranged with the diffusion reflection patterns.

4. The display device of claim 3, wherein the mirror reflection patterns engage the diffusion reflection patterns to form a surface.

5. The display device of claim 2, wherein the optical member further comprises:

a base member disposed in the mirror reflection area, the boundary area, and the diffusion reflection area;

a mirror reflection member comprising the mirror reflection patterns, a portion of the mirror reflection member being disposed in the mirror reflection area and another portion of the mirror reflection member being disposed in the boundary area; and a diffusion reflection member comprising the diffusion reflection patterns, a portion of the diffusion reflection member being disposed in the diffusion reflection area and another portion of the diffusion reflection member being disposed in the boundary area.

6. The display device of claim 2, wherein the optical member further comprises:

a base member disposed in the mirror reflection area, the boundary area, and the diffusion reflection area, the base member comprising a diffusion reflection material; and a mirror reflection member comprising the mirror reflection patterns, a portion of the mirror reflection member being disposed in the mirror reflection area and another portion of the mirror reflection member being disposed in the boundary area, wherein the diffusion reflection patterns correspond to exposed portions of the base member in the boundary area.

7. The display device of claim 2, wherein the optical member further comprises:

a diffusion reflection member disposed in the boundary area and the diffusion reflection area, the diffusion reflection member comprising a diffusion reflection material; and a mirror reflection member comprising the mirror reflection patterns, a portion of the mirror reflection member being disposed in the mirror reflection area and another portion of the mirror reflection member being disposed on the diffusion reflection member in the boundary area, wherein the diffusion reflection patterns correspond to exposed portions of the diffusion reflection member in the boundary area.

8. The display device of claim 2, wherein the optical member further comprises:

a mirror reflection member disposed in the boundary area and the mirror reflection area, the mirror reflection member comprising a mirror reflection material; and a diffusion reflection member comprising the diffusion reflection patterns, a portion of the diffusion reflection member being disposed in the diffusion reflection area and another portion of the diffusion reflection member being disposed on the mirror reflection member in the boundary area, wherein the mirror reflection patterns correspond to exposed portions of the mirror reflection member in the boundary area.

9. The display device of claim 2, wherein the optical member is bent in the boundary area, a distance between the mirror reflection area of the optical member and the display panel increases as the optical member extends in the second direction toward the boundary area, and a distance between the diffusion reflection area of the optical member and the display panel decreases as the optical member extends in the second direction away from the boundary area.

10. The display device of claim 9, wherein the light source comprises:

a circuit board extended in the first direction; and a plurality of light emitting devices disposed on the circuit board and arranged in the first direction.

11. The display device of claim 10, further comprising:

a guide member configured to support the light source and at least the mirror reflection area of the optical member.

12. The display device of claim 11, wherein the guide member comprises:

a body portion coupled to the circuit board;

a first guide portion extending from the body portion, the first guide portion being configured to support the mirror reflection area of the optical member; and a second guide portion spaced apart from the first guide portion in a third direction substantially perpendicular to the first and second directions.

13. A display device, comprising:

a light source configured to emit light;

an optical member configured to guide the light; and a display panel disposed on the optical member, the display panel being configured to display an image using the light guided by the optical member, wherein the optical member comprises:

a mirror reflection area disposed adjacent to the light source, the mirror reflection area being configured to guide at least some of the light emitted from the light source, a diffusion reflection area spaced part from the mirror reflection area, the diffusion reflection area being configured to guide at least some of the light emitted from the light source toward the display panel, and a boundary area disposed between the mirror reflection area and the diffusion reflection area, the boundary area comprising a plurality of diffusion reflection patterns, and wherein the diffusion reflection area comprises sub-reflection patterns configured to guide at least some of the light emitted from the light source along the diffusion reflection area, the sub-reflection patterns being spaced apart from one another, the sub-reflection patterns extending in the second direction, and wherein each of the sub-reflection patterns has a constant width or a width that decreases with increasing distance in the second direction from the light source.

* * * * *